United States Patent
Hogan

(10) Patent No.: US 11,168,717 B2
(45) Date of Patent: Nov. 9, 2021

(54) ACTUATOR CALIBRATION BASED ON A FLUID LEVEL OF A FLUID TANK

(71) Applicant: Caterpillar Paving Products Inc., Brooklyn Park, MN (US)

(72) Inventor: Lee M. Hogan, Champlin, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 134 days.

(21) Appl. No.: 16/725,407

(22) Filed: Dec. 23, 2019

(65) Prior Publication Data

US 2021/0190101 A1 Jun. 24, 2021

(51) Int. Cl.
| | |
|---|---|
| *E01C 23/088* | (2006.01) |
| *F15B 19/00* | (2006.01) |
| *F16K 37/00* | (2006.01) |
| *F16H 61/02* | (2006.01) |
| *E02F 9/22* | (2006.01) |

(52) U.S. Cl.
CPC ........ *F15B 19/002* (2013.01); *F16K 37/0083* (2013.01); *E01C 23/088* (2013.01); *E02F 9/2228* (2013.01); *F15B 19/005* (2013.01); *F15B 2211/20546* (2013.01); *F15B 2211/327* (2013.01); *F15B 2211/6309* (2013.01); *F16H 61/0251* (2013.01)

(58) Field of Classification Search
CPC ........ E02F 9/028; E02F 9/2257; E01C 23/08; E01C 23/12
See application file for complete search history.

(56) References Cited

U.S. PATENT DOCUMENTS

| | | | | | |
|---|---|---|---|---|---|
| 1,411,298 | A | * | 4/1922 | Osborn | H01H 35/027 123/146.5 R |
| 2,486,697 | A | * | 11/1949 | White | G01C 9/12 33/344 |
| 3,846,781 | A | * | 11/1974 | Smith | E02F 9/26 116/53 |
| 7,186,059 | B2 | * | 3/2007 | Barnes | E02F 3/20 241/101.742 |
| 8,794,867 | B2 | * | 8/2014 | Snoeck | E01C 23/085 404/84.05 |
| 9,133,586 | B2 | * | 9/2015 | Reuter | E01C 23/12 |
| 9,879,386 | B2 | | 1/2018 | Marsolek | |

(Continued)

FOREIGN PATENT DOCUMENTS

| CN | 201645656 U | 11/2010 |
|---|---|---|
| CN | 102776827 B | 4/2015 |

(Continued)

*Primary Examiner* — Thomas E Lazo

(57) ABSTRACT

A calibration system is disclosed. The calibration system may include a sensor configured to measure a fluid level in a fluid tank of a machine, an actuator that, when actuated, affects a level of the machine, and a controller. The controller may be configured to: command actuation of the actuator at a current; receive, from the sensor and after commanding actuation of the actuator, information identifying the fluid level in the fluid tank; determine, based on the information identifying the fluid level in the fluid tank, whether there is a change to the fluid level in the fluid tank; and set an initiation current for the actuator at the current based on determining whether there is the change to the fluid level in the fluid tank.

20 Claims, 3 Drawing Sheets

(56) References Cited

U.S. PATENT DOCUMENTS

| | | | |
|---|---|---|---|
| 9,956,842 B2 * | 5/2018 | Muir | E01C 23/127 |
| 10,266,997 B2 | 4/2019 | Tarmann | |
| 2002/0047301 A1 * | 4/2002 | Davis | E01C 19/006 |
| | | | 299/1.5 |

FOREIGN PATENT DOCUMENTS

| CN | 207089273 U | 3/2018 |
|---|---|---|
| CN | 207775665 U | 8/2018 |

* cited by examiner

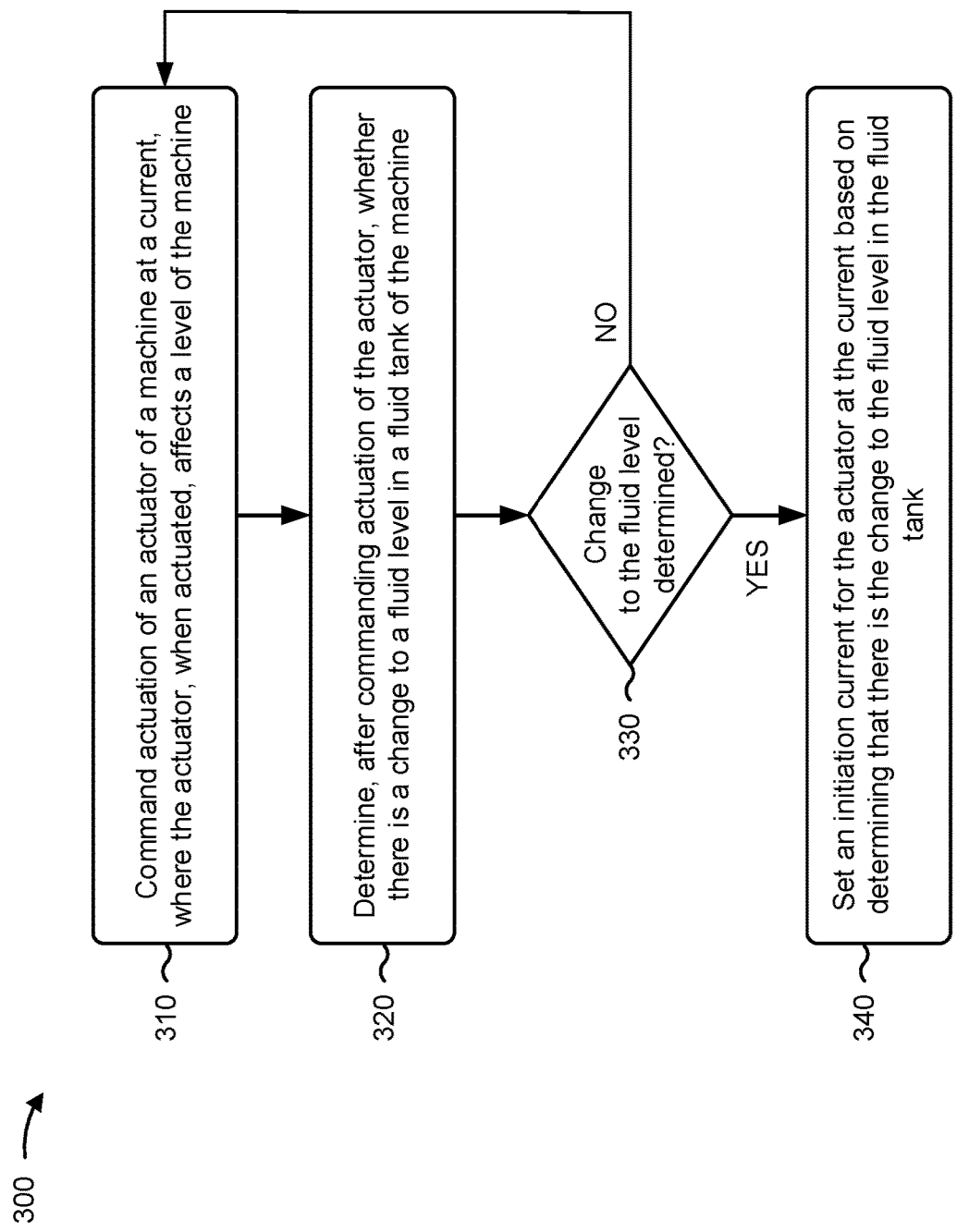

ACTUATOR CALIBRATION BASED ON A FLUID LEVEL OF A FLUID TANK

TECHNICAL FIELD

The present disclosure relates generally to actuator calibration and, for example, to actuator calibration based on a fluid level of a fluid tank.

BACKGROUND

A machine may include one or more components that are movable by actuation. For example, a cold planer may include a plurality of legs that may be raised or lowered by actuation of respective valves (e.g., electrohydraulic valves) that control flows of hydraulic fluid to the plurality of legs. Typically, a controller of the machine may initiate movement of a component by commanding an actuator associated with the component at a particular initiation current. For example, the initiation current may be a cracking current that causes the actuator to open (e.g., crack) a valve that controls the flow of hydraulic fluid to the component. However, in some cases, the initiation current that is commanded to an actuator may not correspond to a cracking current, due to wear of the actuator or valve, due to the actuator operating outside of specified tolerances, and/or the like. As a result, the component may lack appropriate responsiveness to an operator command.

One attempt to balance a construction machine to prevent tilting is disclosed in U.S. Pat. No. 9,133,586 that issued to BOMAG GmbH on Sep. 15, 2015 ("the '586 patent"). In particular, the '586 patent discloses a pressure measuring device that is allocated to an actuator of a construction machine and is designed to ascertain the value of a pressure applied to the actuator. The '586 patent indicates that the pressure values monitored represent a gauge for the degree of tip of the construction machine.

While the pressure measuring device of the '586 patent may enable monitoring of a degree of tip of a construction machine, the '586 patent does not address calibration of an initiation current for an actuator. In addition, the '586 patent does not indicate that the degree of tip may be monitored based on a fluid level of a fluid tank of the construction machine. Rather, the '586 patent describes the use of pressure measuring devices to monitor the degree of tip, which introduces additional components that may wear or fail.

The calibration system of the present disclosure solves one or more of the problems set forth above and/or other problems in the art.

SUMMARY

According to some implementations, a method may include commanding, by a controller of a machine, actuation of an actuator of the machine at a current, the actuator, when actuated, affecting a level of the machine; determining, by the controller and after commanding actuation of the actuator, whether there is a change to a fluid level in a fluid tank of the machine; and setting, by the controller, an initiation current for the actuator at the current based on determining whether there is the change to the fluid level in the fluid tank.

According to some implementations, a calibration system may include a sensor configured to measure a fluid level in a fluid tank of a machine; an actuator that, when actuated, affects a level of the machine; and a controller configured to: command actuation of the actuator at a current; receive, from the sensor during and after commanding actuation of the actuator, information identifying the fluid level in the fluid tank; determine, based on the information identifying the fluid level in the fluid tank, whether there is a change to the fluid level in the fluid tank; and set an initiation current for the actuator at the current based on determining whether there is the change to the fluid level in the fluid tank.

According to some implementations, a machine may include a component, controlled by an actuator, that when actuated affects a level of the machine; a fluid tank configured to hold a fluid of the machine; and a controller configured to: command actuation of the actuator at a current; determine, after commanding actuation of the actuator, whether there is a change to a position of the component based on determining whether there is a change to a fluid level in the fluid tank; and set an initiation current for the actuator at the current based on determining whether there is the change to the fluid level in the fluid tank.

BRIEF DESCRIPTION OF THE DRAWINGS

FIG. 3 is a flowchart of an example process for actuator calibration based on a fluid level of a fluid tank.

DETAILED DESCRIPTION

Figure 1:
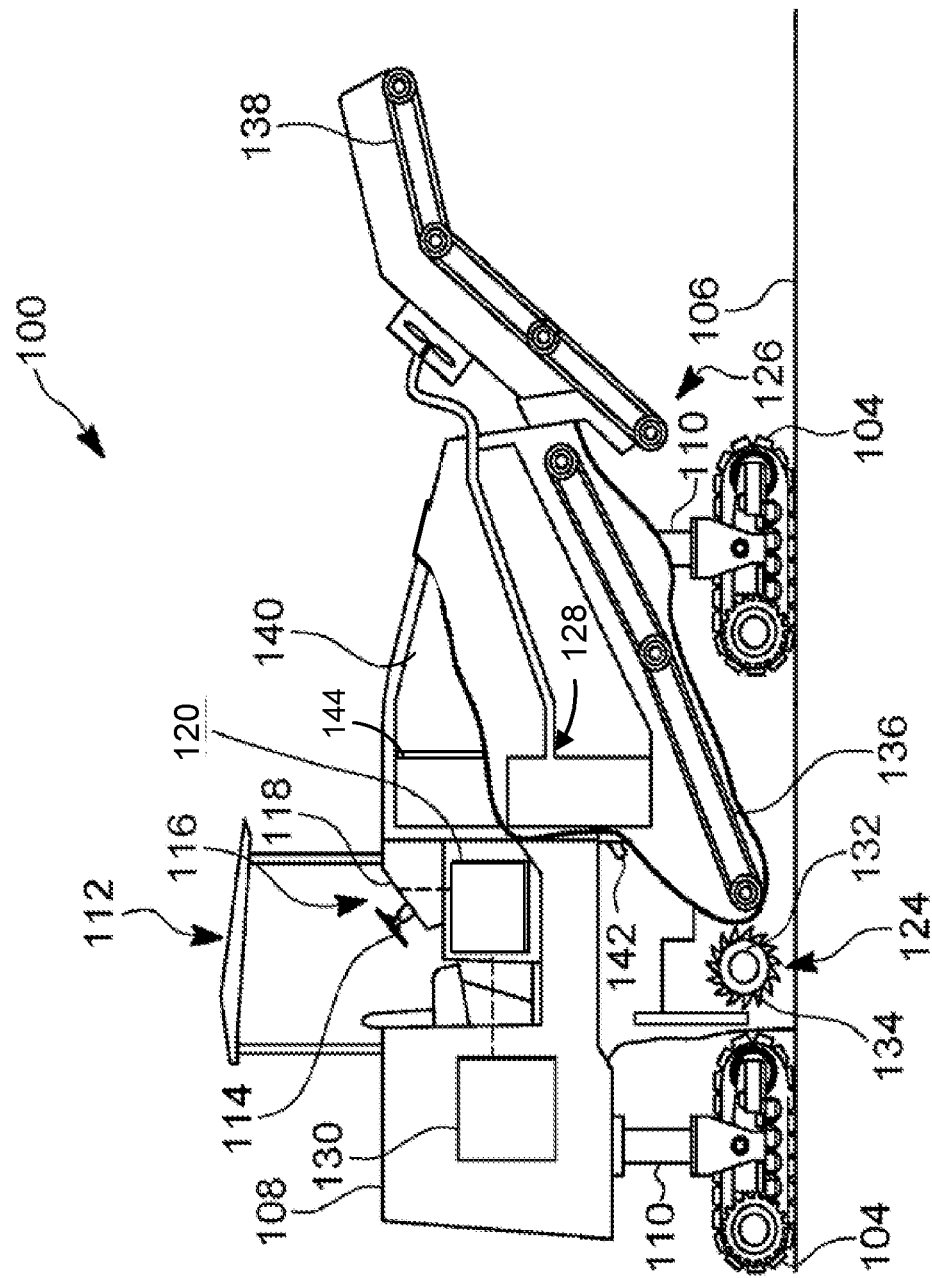
FIG. 1 is a diagram of an example machine described herein.

FIG. 1 is a diagram of an example machine 100. As shown in FIG. 1, the machine 100 is embodied as a cold planer. Alternatively, the machine 100 may be a rotary mixer, a paver, or another machine that includes a component, controlled by an actuator, that when actuated causes a tilt of the machine 100 (e.g., a machine that employs telescoping legs).

The machine 100 includes a plurality of ground engagement members 104 to propel the machine 100 on a road surface 106. Although two ground engagement members 104 are shown in FIG. 1, the machine 100 may include four ground engagement members 104 located at a front-right, a front-left, a back-right, and a back-left of the machine 100 relative to a direction of travel of the machine 100. Moreover, although the ground engagement members 104 are shown in FIG. 1 as including tracks, the ground engagement members 104 may additionally, or alternatively, include wheels.

The plurality of ground engagement members 104 are connected to a frame 108 of the machine 100 through a plurality of hydraulic legs 110. Each hydraulic leg 110 is associated with an actuator (e.g., a solenoid actuator) that controls a position (e.g., a height) of the hydraulic leg 110. For example, the actuator may control a valve (e.g., an electrohydraulic valve) that controls a flow of hydraulic fluid to the hydraulic leg 110, thereby expanding or contracting the hydraulic leg 110. Actuators for the hydraulic legs 110 may operate independently from each other. For example, hydraulic legs 110 on the left side of the machine 100 may extend further than hydraulic legs 110 on the right side of the machine 100, thereby causing a rightward tilt of the machine 100 relative to the road surface 106.

The frame 108 of the machine 100 supports an operator area 112. The operator area 112 includes a steering command element 114 (e.g., a steering wheel, a joystick, a lever, and/or the like) and a control panel 116. The control panel 116 includes a user interface unit 118 configured to receive input(s) from an operator of the machine 100. The user interface unit 118 is in communication with a controller 120 of the machine 100 that is configured to communicate control signals to one or more systems of the machine 100. The one or more systems may include the plurality of ground engagement members 104, a milling system 124, a conveyor system 126, a ventilation system 128, and/or an engine 130.

The engine 130 supplies power to the plurality of ground engagement members 104 to propel the machine 100. Such propulsion may be accomplished by driving a hydraulic pump (not shown) with an output of the engine 130. The hydraulic pump supplies high-pressure hydraulic fluid to individual motors (not shown) associated with the plurality of ground engagement members 104. The engine 130 also supplies power to the milling system 124 to rotatably drive a milling drum 132 of the milling system 124 to carry out a milling operation on the road surface 106.

The milling system 124 is supported on the frame 108, and facilitates milling of the road surface 106 using milling drum 132, which includes a plurality of cutting tools 134 (e.g., arranged circumferentially around the milling drum 132). The milling drum 132 rotates upon receiving power from the engine 130, such that the plurality of cutting tools 134 come in repeated contact with the road surface 106 to break up one or more layers of material from the road surface 106. The hydraulic legs 110 may act as telescopic actuators configured to raise and lower the milling system 124 relative to the plurality of ground engagement members 104 to control a depth of cut by the milling system 124.

The material resulting from the removal of the one or more layers of the road surface 106 is discharged from the machine 100 using the conveyor system 126. The conveyor system 126 includes at least one conveyor belt. For example, the conveyor system 126 may include a lower conveyor belt 136 and an upper conveyor belt 138 positioned adjacent to the lower conveyor belt 136. The lower conveyor belt 136 collects material from the milling operation and transports the material to the upper conveyor belt 138, and the upper conveyor belt 138 transports the material to a discharge location.

The machine 100 further includes a water tank 140 supported on the frame 108. The water tank 140 may be positioned under a hood (not shown) of the machine 100 and proximal to the milling system 124 and the conveyor system 126. The water tank 140 is in communication with at least one water nozzle 142 to selectively dispense water stored in the water tank 140 toward the milling drum 132 and the plurality of cutting tools 134 of the milling system 124. The water tank 140 includes a sensor 144 configured to measure a water level of the water tank 140. For example, the sensor 144 may be a liquid level sensor. The machine 100 may include additional fluid tanks and associated fluid level sensors, such as a diesel exhaust fluid (DEF) tank and associated DEF level sensor, a fuel tank and associated fuel level sensor, and/or the like.

The controller 120 (e.g., an electronic control module (ECM)) may include one or more memories and one or more processors that implement operations associated with actuator calibration based on a fluid level of a fluid tank (e.g., water tank 140) of the machine 100, as described in connection with FIG. 2. For example, the controller 120 may be configured to command actuation of an actuator at a current, determine whether there is a change to a fluid level in a fluid tank of the machine, and set an initiation current for the actuator at the current based on determining whether there is the change to the fluid level in the fluid tank.

As indicated above, FIG. 1 is provided as an example. Other examples may differ from what is described in connection with FIG. 1.

Figure 2:
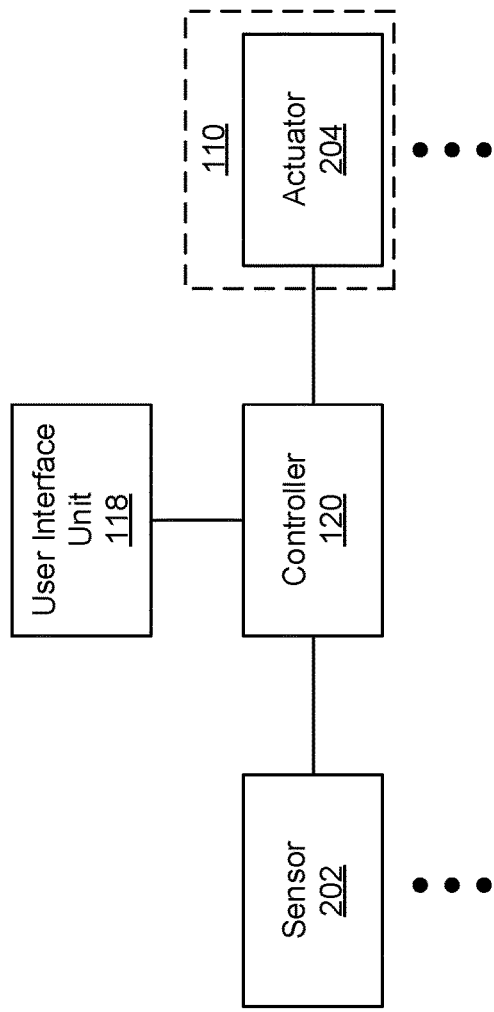
FIG. 2 is a diagram of an example calibration system described herein.

FIG. 2 is a diagram of an example calibration system 200. As shown in FIG. 2, the calibration system 200 includes the user interface unit 118, the controller 120, one or more sensors 202, and one or more actuators 204. The controller 120 may be in communication with the user interface unit 118, the sensors 202, and the actuators 204 via wired connections or wireless connections.

The controller 120 may receive from the user interface unit 118 an operator command to perform a calibration procedure for the actuators 204. That is, an operator may request calibration of the actuators 204 via the user interface unit 118. In some implementations, the controller 120 may determine (e.g., without receiving an operator command) to perform a calibration procedure for the actuators 204, for example, based on detecting a miscalibration of one or more of the actuators 204, based on an expiration of a threshold time period from a previous calibration of the actuators 204, and/or the like. Additionally, or alternatively, the controller 120 may perform a calibration procedure for the actuators 204 based on an operation performed at the user interface unit 118 (e.g., during operation of the machine 100). For example, the controller 120 may perform the calibration procedure for the actuators 204 when an operator is manipulating an actuator command element of the user interface unit 118. Prior to performing the calibration procedure, the controller 120 may command the actuators 204 to a neutral position (e.g., a level position).

An actuator 204, which may be controlled by a solenoid, may control a valve that controls a flow of hydraulic fluid to a component of the machine 100. As shown in FIG. 2, each actuator 204 is associated with a respective hydraulic leg 110 of the machine 100. Thus, an actuator 204, when actuated, affects a level of the machine 100 (e.g., affects a level of the frame 108 or a level of a fluid tank, such as the water tank 140). For example, the actuator 204 may cause the machine 100 to tilt, cause the machine 100 to become level, and/or the like. An actuator 204 may be associated with another actuatable component of the machine 100, such as a component that, when actuated, affects a level of the machine 100. For example, the component may be a leg (e.g., a leveling leg) and the actuator 204 controls a position of the leg, the component may be an arm (e.g., a horizontally extending arm, a boom, an excavator arm, and/or the like) and the actuator 204 controls a position of the arm, the component may be an implement (e.g., a screed, a bucket, a dump, and/or the like) and the actuator 204 controls a position of the implement, and/or the like.

According to the calibration procedure, the controller 120 may, for each actuator 204, command actuation of the actuator 204 at a current that increases over time until a change of a level (e.g., a tilt) of the machine 100 is detected, thereby indicating an initiation current (e.g., a cracking current) for the actuator 204. For example, the controller 120 may command actuation of the actuator 204 at a current, and the controller 120 may determine whether the current caused actuation of the actuator 204 (e.g., caused the actuator 204 to open a valve) based on a fluid level in a fluid tank of the machine 100. That is, the controller 120 may determine that the current caused actuation of the actuator 204 when a change to the fluid level (e.g., relative to a previous fluid level measurement) is detected.

For example, the controller 120 may monitor the fluid level while increasing a current commanded to the actuator 204 in order to detect a change to the fluid level. As an example, the controller 120 may command actuation of the actuator 204 at a current, and if no change to the fluid level is detected, the controller 120 may command actuation of the actuator 204 at an increased current, and so forth. Although no actual change to an amount of fluid in the fluid tank occurs, the change in the fluid level is detected due to a change of a level of the machine 100 caused by actuation of the actuator 204.

The controller 120 may receive information identifying the fluid level in the fluid tank from a sensor 202 that is associated with (e.g., located in) the fluid tank. In some implementations, the fluid tank may correspond to the water tank 140 and the sensor 202 may correspond to the sensor 144. Additionally, or alternatively, the fluid tank may be another fluid tank of the machine 100, such as a DEF tank, a fuel tank, and/or the like. Accordingly, the controller 120 may receive fluid level information from a plurality of sensors 202 respectively associated with a plurality of fluid tanks (e.g., one or more water tanks, DEF tanks, fuel tanks, and/or the like) of the machine 100.

The fluid level information received from a sensor 202 may be unfiltered, or may have undergone less filtering than fluid level information received by the controller 120 in connection with an operation that is not associated with the calibration procedure. Additionally, or alternatively, the controller 120 may not perform filtering of the fluid level information or may perform less filtering of the fluid level information than would be performed for fluid level information in connection with an operation that is not associated with the calibration procedure. The filtering may be performed (e.g., in connection with an operation that is not associated with the calibration procedure) to normalize fluid level information, to remove noisy data from the fluid level information, and/or the like.

The controller 120 may determine whether a current caused actuation of the actuator 204 based on fluid level information received from a single sensor 202 or from a plurality of sensors 202. For example, the controller 120 may aggregate fluid level information received from a plurality of sensors 202 in order to determine whether a current caused actuation of the actuator 204. As an example, the controller 120 may determine that the current caused actuation of the actuator 204 when a threshold quantity of the plurality of fluid tanks report fluid level information indicating a change in fluid level.

In addition, the controller 120 may select a single sensor 202 from the plurality of sensors 202 that is to be used to determine whether a current caused actuation of the actuator 204. For example, the controller 120 may select the single sensor 202 based on a determination that the sensor 202 is off-center in a fluid tank (e.g., according to a configuration of the fluid tank or the machine 100), a determination that a fluid level of the fluid tank satisfies a capacity range (e.g., 25% to 75%, 40% to 60%, or 45% to 55%), and/or a determination that the fluid level is static (e.g., the fluid level is not changing, or is changing by an amount that satisfies a threshold value, due to movement of the machine 100 that is not associated with the calibration procedure). The controller 120 also may select a subset of the plurality of sensors 202 that are to be used to determine whether a current caused actuation of the actuator 204 in a similar manner. In other words, the controller 120 may use fluid level information from a sensor 202 for determining whether a current caused actuation of the actuator 204 if the sensor is off-center in a fluid tank, if a fluid level of the fluid tank satisfies a capacity range, and/or if the fluid level is static.

Based on determining that a current caused actuation of the actuator 204 (e.g., a change in the fluid level was detected), the controller 120 may set (e.g., configure, store, save, and/or the like) an initiation current (e.g., a cracking current) for the actuator 204 at the current. The initiation current is a current that the controller 120 will command to the actuator 204 when an operator subsequently requests to initiate actuation of the actuator 204. After performing the calibration procedure for the actuator 204, the controller 120 may repeat the calibration procedure for a different positional movement of the actuator 204 and/or for one or more additional actuators 204. For example, the controller 120 may perform calibration procedures for raising the front-left hydraulic leg 110 of machine 100, lowering the front-left hydraulic leg 110, raising the front-right hydraulic leg 110, lowering the front-right hydraulic leg 110, raising the rear hydraulic legs 110, and/or lowering the rear hydraulic legs 110.

As indicated above, FIG. 2 is provided as an example. Other examples may differ from what is described in connection with FIG. 2.

FIG. 3 is a flowchart of an example process 300 for actuator calibration based on a fluid level of a fluid tank. One or more process blocks of FIG. 3 may be performed by a controller (e.g., controller 120). Additionally, or alternatively, one or more process blocks of FIG. 3 may be performed by another device or a group of devices separate from or including the controller, such as another device or component that is internal or external to the machine 100.

As shown in FIG. 3, process 300 may include commanding actuation of an actuator of a machine at a current, where the actuator, when actuated, affects a level of the machine (block 310). For example, the controller (e.g., using a processor, a memory, an output component, a communication interface, and/or the like) may command actuation of an actuator of the machine at a current, as described above. The actuator may be associated with a component of the machine that, when actuated, affects a level of the machine. For example, the actuator may control (e.g., based on controlling a valve that controls a flow of hydraulic fluid) at least one of a position of a leg of the machine, a position of an arm of the machine, or a position of an implement of the machine. Actuation of the actuator may be commanded based on receiving an operator command to perform a calibration of the actuator.

As further shown in FIG. 3, process 300 may include determining, after commanding actuation of the actuator, whether there is a change to a fluid level in a fluid tank of the machine (block 320). For example, the controller (e.g., using a processor, a memory, an input component, a communication interface, and/or the like) may determine, after commanding actuation of the actuator, whether there is a change to a fluid level in a fluid tank of the machine, as described above. The fluid tank may be one of a plurality of fluid tanks of the machine, in which case, process 300 may include determining whether there are changes to respective fluid levels in the plurality of fluid tanks.

Determining whether there is the change to the fluid level may be based on a measurement of a sensor associated with the fluid tank. The sensor may have an off-centered position in the fluid tank. The fluid tank may be a water tank, a fuel tank, or a DEF tank.

In some implementations, process 300 includes selecting the fluid tank for determining whether there is the change to the fluid level based on a determination that a sensor of the fluid tank is off-center or the fluid level satisfies a range.

As further shown in FIG. 3, if the change to the fluid level is not determined (block 330—NO), then process 300 may include returning to block 310. In such a case, the current commanded may be increased relative to a previous iteration.

If the change to the fluid level is determined (block 330—YES), then as further shown in FIG. 3, process 300 may include setting an initiation current for the actuator at the current based on determining that there is the change to the fluid level in the fluid tank (block 340). For example, the controller (e.g., using a processor, a memory, a storage component, and/or the like) may set an initiation current for the actuator at the current based on determining that there is the change to the fluid level in the fluid tank, as described above. The initiation current for the actuator may be set at the current based on a determination that the fluid level satisfies a range.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

The disclosed calibration system may be used with any machine that includes a component, controlled by an actuator, that when actuated affects a level of the machine. For example, the calibration system may be used with a machine that includes a leg leveling system that employs one or more telescoping legs. The calibration system enables calibration of an initiation current of an actuator of a machine based on a fluid level in a fluid tank of the machine. In this way, sensors associated with the actuator, which may fail and/or may be difficult to replace, are not needed to calibrate the actuator. Moreover, the fluid level may provide an accurate indication of a cracking current that may be used for the actuator, thereby improving a responsiveness of the actuator.

What is claimed is:

1. A method, comprising:
commanding, by a controller of a machine, actuation of an actuator of the machine at a current,
the actuator, when actuated, affecting a level of the machine;
determining, by the controller and after commanding actuation of the actuator, whether there is a change to a fluid level in a fluid tank of the machine; and
setting, by the controller, an initiation current for the actuator at the current based on determining whether there is the change to the fluid level in the fluid tank.

2. The method of claim 1, wherein the actuator controls at least one of:
a position of a leg of the machine;
a position of an arm of the machine; or
a position of an implement of the machine.

3. The method of claim 1, wherein determining whether there is the change to the fluid level is based on a measurement, of a sensor associated with the fluid tank, that is unfiltered or that has undergone less filtering relative to another measurement of the sensor.

4. The method of claim 3, wherein the sensor has an off-centered position in the fluid tank.

5. The method of claim 1, wherein determining whether there is the change to the fluid level comprises:
monitoring the fluid level while increasing the current; and
detecting, based on monitoring the fluid level, the change to the fluid level.

6. The method of claim 1, further comprising:
receiving an operator command to perform a calibration of the actuator prior to commanding actuation of the actuator.

7. The method of claim 1, further comprising:
selecting the fluid tank for determining whether there is the change to the fluid level based on a determination that a sensor of the fluid tank is off-center or the fluid level satisfies a range.

8. A calibration system, comprising:
a sensor configured to measure a fluid level in a fluid tank of a machine;
an actuator that, when actuated, affects a level of the machine; and
a controller configured to:
command actuation of the actuator at a current;
receive, from the sensor during and after commanding actuation of the actuator, information identifying the fluid level in the fluid tank;
determine, based on the information identifying the fluid level in the fluid tank, whether there is a change to the fluid level in the fluid tank; and
set an initiation current for the actuator at the current based on determining whether there is the change to the fluid level in the fluid tank.

9. The calibration system of claim 8, wherein the actuator controls at least one of:
a position of a leg of the machine;
a position of an arm of the machine; or
a position of an implement of the machine.

10. The calibration system of claim 8, wherein the sensor has an off-centered position in the fluid tank.

11. The calibration system of claim 8, wherein the controller is configured to set the initiation current for the actuator at the current based on a determination that the fluid level satisfies a range.

12. The calibration system of claim 8, wherein the controller is further configured to:
command actuation of the actuator at an increased current based on a determination that there is no change to the fluid level.

13. The calibration system of claim 8, wherein the fluid tank is one of a plurality of fluid tanks of the machine, and wherein the controller is further configured to:
select the fluid tank for determining whether there is the change to the fluid level based on a determination that the sensor is off-center in the fluid tank or the fluid level satisfies a range.

14. A machine, comprising:
a component, controlled by an actuator, that when actuated affects a level of the machine;
a fluid tank configured to hold a fluid of the machine; and
a controller configured to:
command actuation of the actuator at a current;
determine, after commanding actuation of the actuator, whether there is a change to a position of the component based on determining whether there is a change to a fluid level in the fluid tank; and
set an initiation current for the actuator at the current based on determining whether there is the change to the fluid level in the fluid tank.

15. The machine of claim 14, wherein the component is at least one of:
a leg of the machine;
an arm of the machine; or
an implement of the machine.

16. The machine of claim 14, wherein the fluid tank is at least one of:
   a water tank;
   a fuel tank; or
   a diesel exhaust fluid tank.

17. The machine of claim 14, wherein the actuator controls a valve, associated with the component, that controls a flow of hydraulic fluid.

18. The machine of claim 14, wherein the fluid tank is one of a plurality of fluid tanks of the machine, and
   wherein the controller is configured to determine whether there is the change to the position of the component based on determining whether there are changes to respective fluid levels in the plurality of fluid tanks.

19. The machine of claim 14, wherein the fluid tank is one of a plurality of fluid tanks of the machine, and
   wherein the controller is further configured to:
      select the fluid tank for determining whether there is the change to the position of the component based on a determination that a sensor of the fluid tank is off-center or the fluid level satisfies a range.

20. The machine of claim 14, wherein the controller is further configured to:
   command actuation of the actuator at an increased current based on a determination that there is no change to the fluid level.

* * * * *